(12) United States Patent
Usui (10) Patent No.: US 11,295,185 B2
(45) Date of Patent: Apr. 5, 2022

(54) IMAGE PROCESSING DEVICE, IMAGE PROCESSING METHOD, AND RECORDING DEVICE

(71) Applicant: SEIKO EPSON CORPORATION, Tokyo (JP)

(72) Inventor: Masaya Usui, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/099,817

(22) Filed: Nov. 17, 2020

(65) Prior Publication Data

US 2021/0150292 A1 May 20, 2021

(30) Foreign Application Priority Data

Nov. 19, 2019 (JP) .............................. JP2019-208555

(51) Int. Cl.
*G06K 15/02* (2006.01)
*G06F 3/12* (2006.01)
*H04N 1/60* (2006.01)

(52) U.S. Cl.
CPC ....... *G06K 15/1878* (2013.01); *G06F 3/1208* (2013.01); *G06F 3/1243* (2013.01); *H04N 1/6008* (2013.01)

(58) Field of Classification Search
CPC . G06K 15/1817; G06F 3/1208; G06F 3/1234; H04N 1/6008

USPC ................................ 358/1.9, 1.15, 518, 515
See application file for complete search history.

(56) References Cited

U.S. PATENT DOCUMENTS

2012/0153023 A1\* 6/2012 Morgana ............ G06K 7/10851
235/462.04
2016/0086065 A1 3/2016 Kawashima et al.

FOREIGN PATENT DOCUMENTS

JP 2016-064511 A 4/2016

\* cited by examiner

*Primary Examiner* — Quang N Vo
(74) *Attorney, Agent, or Firm* — Global IP Counselors, LLP (57) ABSTRACT

An image processing device includes a code detection unit configured to detect a code image included in the input image, a pixel value determination unit configured to determine whether a pixel value of each pixel included in the code image corresponds to an intermediate color between a color of code elements constituting the code image and a color of a space between the code elements, and a pixel value converting unit configured to convert a pixel value of a separated pixel that is separated from the code elements by k pixels or more, among intermediate color pixels that are pixels determined to correspond to the intermediate color, into a pixel value brighter than the intermediate color, wherein k is an integer of 2 or greater.

7 Claims, 5 Drawing Sheets

IMAGE PROCESSING DEVICE, IMAGE PROCESSING METHOD, AND RECORDING DEVICE

The present application is based on, and claims priority from JP Application Serial Number 2019-208555, filed Nov. 19, 2019, the disclosure of which is hereby incorporated by reference herein in its entirety.

BACKGROUND

1. Technical Field

The present disclosure relates to an image processing device, an image processing method, and a recording device.

2. Related Art

It is disclosed that an image processing device performs, when the information of the barcode image is included in the image data for forming an image by an image forming unit, and when either of the resolution of the image forming unit and the resolution of the image data is not integer multiple of the other, regarding the resolution of the image data at the location of a barcode image as a resolution that one is an integer multiple of the other, and outputting to the image forming unit (See JP-A-2016-64511).

When a draft on which a code image such as a barcode and a two-dimensional code (QR code (registered trademark) and the like) is recoded is read by a reading apparatus such as a scanner, in the generated image data, a blur may occur in the edge portion of each element such as a bar constituting the code image. The blur is expressed in a color that is brighter than a color of the element and darker than a color of space between elements. The color of such a blur is called an intermediate color or halftone.

When halftone processing is executed to make image data including the code image in which the blur occurs in the edge portion of the element such as a bar recorded on a recording medium, the quality of the code image sometimes deteriorates due to unnecessary generation of dots corresponding to pixels that match the blur.

SUMMARY

An image processing device includes a code detection unit configured to detect a code image included in the input image, a pixel value determination unit configured to determine whether a pixel value of each pixel included in the code image corresponds to an intermediate color between a color of code elements constituting the code image and a color of a space between the code elements, and a pixel value converting unit configured to convert a pixel value of a separated pixel that is separated from the code elements by k pixels or more, among intermediate color pixels that are pixels determined to correspond to the intermediate color, into a pixel value brighter than the intermediate color, wherein k is an integer of 2 or greater.

DESCRIPTION OF EXEMPLARY EMBODIMENTS

Hereinafter, the embodiments of the present disclosure will be described below with reference to the drawings. Note that, each drawing is merely illustrative for explaining the present embodiment. Because the drawings are exemplary, the proportions or shapes may not be precise, or match with each other, or part of them may be omitted.

1. Device Configuration

Figure 1:
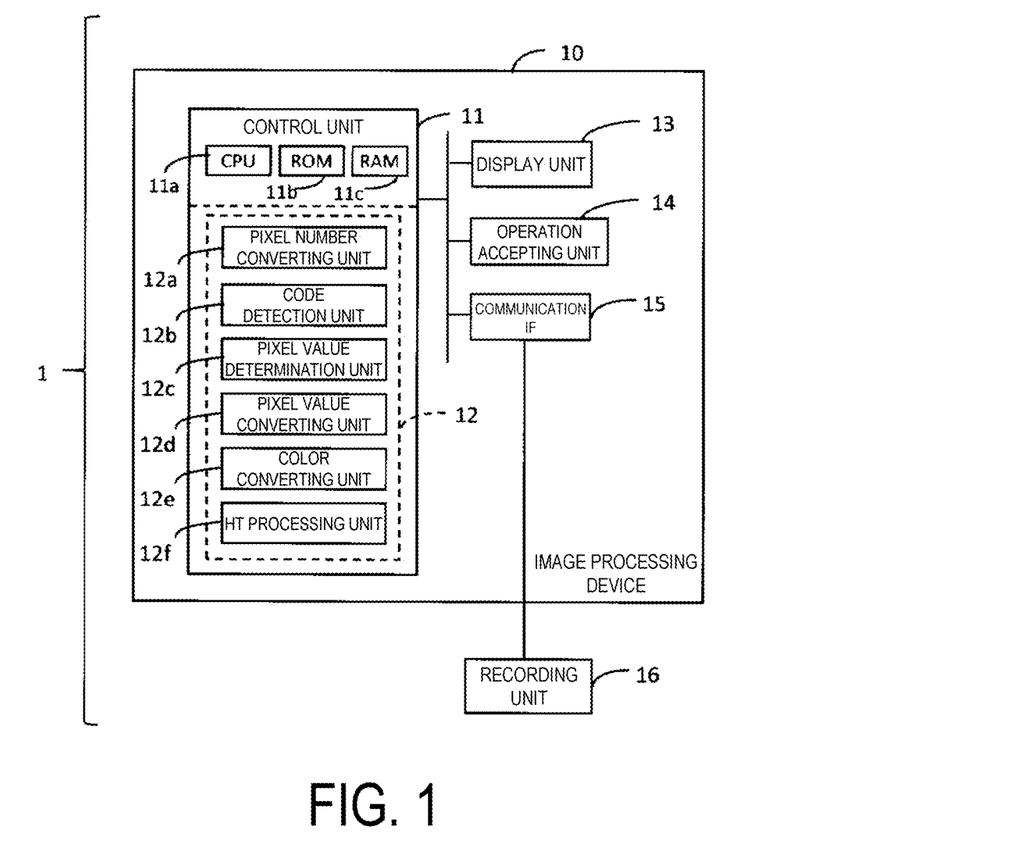
FIG. 1 is a block diagram schematically illustrating a configuration of an image processing device.

FIG. 1 schematically illustrates a configuration of an image processing device 10 according to the present embodiment.

The image processing device 10 executes an image processing method. The image processing device 10 includes a control unit 11, a display unit 13, an operation accepting unit 14, a communication interface 15, and the like. The interface is abbreviated as IF. The control unit 11 is configured to include one or a plurality of ICs including a CPU 11a as processor, a ROM 11b, a RAM 11c, other nonvolatile memory, and the like.

In the control unit 11, the CPU 11a serving as a processor executes calculation processing according to a program stored in the ROM 11b or other memories, and the like, using the RAM 11c or the like as a work area, thereby controls the image processing device 10. The control unit 11 functions as a pixel number converting unit 12a, a code detection unit 12b, a pixel value determination unit 12c, a pixel value converting unit 12d, a color converting unit 12e, a HT processing unit 12f, and the like, by following an image processing program 12. HT is the abbreviation for half tone. Note that the processor is not limited to one single CPU, it may have a configuration in which processing is performed by a hardware circuit such as a plurality of CPUs, or an ASIC, or the like, or a configuration in which the CPU and the hardware circuit cooperate to perform the processing.

The display unit 13 is a unit configured to display visual information, and is composed of, for example, a liquid crystal display, an organic electroluminescent display, or the like. The display unit 13 may be configured to include a display and a drive circuit that drives the display. The operation accepting unit 14 is a unit configured to receive operations by a user, and is realized by, for example, a physical button, a touch panel, a mouse, a keyboard, or the like. Of course, the touch panel may be realized as one of the functions of the display unit 13.

The display unit 13 and the operation accepting unit 14 may be part of the configuration of the image processing device 10, but they may be a peripheral device externally attached to the image processing device 10. The communication IF 15 is a generic term for one or a plurality of the IFs for the image processing device 10 to execute wired or wireless communication with external devices according to a prescribed communication protocol including a known communication standard.

The recording unit 16 is, for example, a device to which the image processing device 10 connects via the communication IF 15. In other words, the recording unit 16 is a recording device controlled by the image processing device 10. The recording device is also called as a printer, a printing device, or the like. The recording unit 16 performs recording on a medium based on the recording data transmitted from the image processing device 10. The recording unit 16 is able to execute recording by discharging inks of a plurality of colors such as cyan (C), magenta (M), yellow (Y), and black (K) by an ink-jet method. According to the ink-jet method, the recording unit 16 performs the recording to the medium based on the recording data in which a dot on or a dot off is defined for each pixel, and ejecting the ink dots from nozzle which is not illustrated. The medium is typically paper, but may be a medium of material other than paper.

The image processing device 10 is realized by, for example, a personal computer, a smartphone, a tablet terminal, a mobile phone, or an information processing device having the same processing capacity as those. In addition, the image processing device 10 may be realized not only by an independent single information processing device, but also by a plurality of information processing devices communicatively connected to each other via a network.

The configuration including image processing device 10 and recording unit 16 can be regarded as a system 1.

Alternatively, the image processing device 10 and the recording unit 16 may be one integrated device 1. That is, a recording device 1 may be configured to include the image processing device 10 and the recording unit 16. The recording device 1 including the image processing device 10 and the recording unit 16 may be a multifunction peripheral having a plurality of functions such as a copy function and a facsimile function.

2. Image Processing Method

Figure 2:
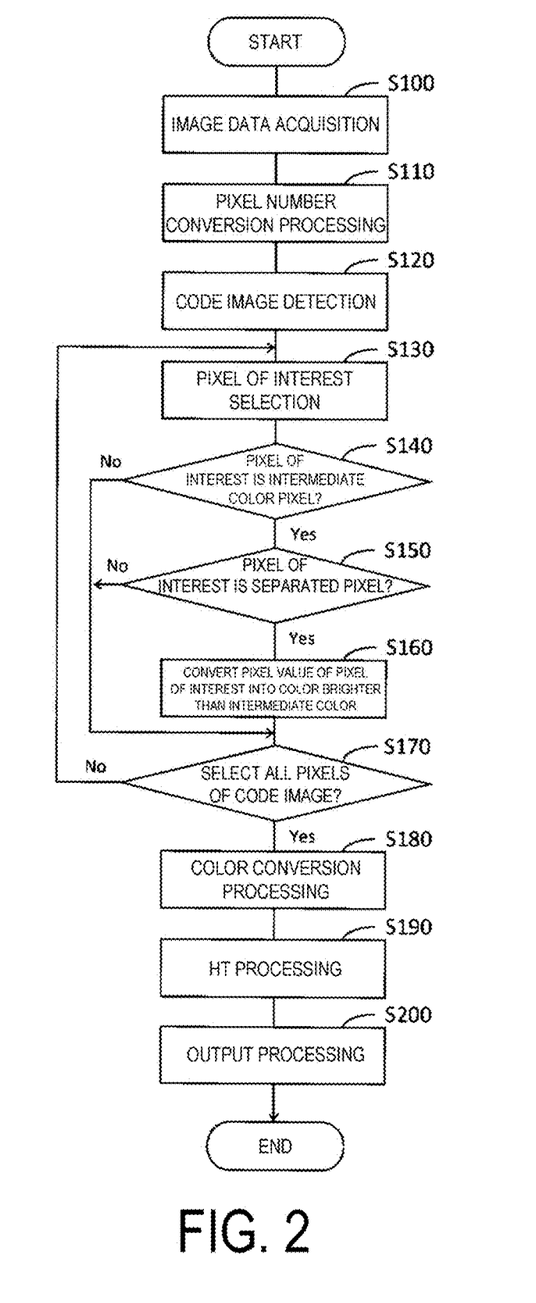
FIG. 2 is a flowchart illustrating image processing.

FIG. 2 illustrates image processing according to the present embodiment in which the control unit 11 executes according to the image processing program 12 by flowchart.

In step S100, the control unit 11 acquires image data to be processed. The control unit 11 acquires image data from the storage source of the image data, for example, in response to an instruction to select the image data by the user via the operation accepting unit 14. The storage source of the image data varies, for example, a memory or a hard disk drive in the image processing device 10, or an external memory or server and the like. The image data acquired in step S100 is input image. The input image is assumed to be the image data generated by reading some drafts using the scanner.

The image data is RGB data in a bitmap format, for example, each pixel has a gradation value of each RGB (red, green, blue). The gradation value is represented by 256 gradations from 0 to 255, for example. Of course, the control unit 11 can acquire RGB data to be processed by appropriately converting the format of the image data.

In step S110, the pixel number converting unit 12a executes pixel number conversion processing of the image data as necessary. The pixel number conversion is a processing in which both vertical resolution and horizontal resolution of the image data are combined with both vertical recording resolution and horizontal recording resolution recorded by the recording unit 16. It is assumed that the recording resolution is known at the time of step S110 due to the product specification of the recording unit 16 and the configuration related to the recording previously input by user via the operation accepting unit 14. For example, if both the vertical resolution and the horizontal resolution of the image data are 300 dpi, and both the vertical recording resolution and the horizontal recording resolution are 600 dpi, each number of pixels in the vertical and horizontal directions of the image data is doubled. Dpi means the number of pixels per inch. Depending on the relationship between the image data and the recording resolution, the magnification for the pixel number conversion may be 1.0 and the pixel number conversion may not be substantially performed.

In step S120, the code detection unit 12b detects a region corresponding to the code image from the image data. In the present embodiment, a "code" or a "code image" is one of pattern images in which information is encoded, and is a barcode, a QR code (registered trademark), or other two-dimensional code. As a method of detecting the code image, various methods including known methods can be used. For example, the code detection unit 12b can detect a region in the image data in which the black bar is arranged for not less than a predetermined number in a direction crossing the length direction of the bar, as a barcode. Step S120 corresponds to a detection step of detecting a code image.

In step S130, the pixel value determination unit 12c selects a pixel included in a region corresponding to the code image detected in step S120, which is one pixel which has not been selected as a pixel of interest until now as the pixel of interest. Note that, although not specifically illustrated in FIG. 2, when the code image cannot be detected from the image data in step S120, the control unit 11 proceeds to step S180 without executing step S130 to S170. Hereinafter, description will be continued on the assumption that the code image is successfully detected from the image data.

In step S140, the pixel value determination unit 12c determines whether the pixel of interest corresponds to an intermediate color pixel. Then, if the pixel of interest corresponds to the intermediate color pixel, the processing proceeds from the determination of "Yes" to step S150, if the pixel of interest does not correspond to the intermediate color pixel, the processing proceeds from the determination of "No" to step S170.

An "intermediate color pixel" means a pixel corresponding to an intermediate color between a color of the code elements constituting the code image and a color of a space between the code elements. An "intermediate color" means a color brighter than the color of the code element and darker than the color of the space. A "code element" for example, refers to each bar constituting a barcode, if the code image is a barcode. The color of the code elements, in many cases, is black or a dark color similar to black. On the other hand, the color of the space is often white or a light color similar to white. For convenience, a pixel whose pixel value is the color of the code element is called a "code element pixel", a pixel whose pixel value is the color of the space is called a "space pixel".

The pixel value determination unit 12c may compare the pixel value of the pixel of interest with a predetermined threshold, which is set for defining the intermediate color, to determine whether the pixel of interest corresponds to the intermediate color pixel. For example, as thresholds, a first threshold indicating the lower limit of the brightness of the intermediate color and a second threshold indicating the upper limit of the brightness of the intermediate color are set. The pixel value determination unit 12c converts the pixel value of the pixel of interest into the brightness. Then, if the brightness of the pixel of interest is not less than the first threshold and not greater than the second threshold, it is determined that the pixel of interest corresponds to the intermediate color pixel. Additionally, if the brightness of the pixel of interest is less than the first threshold, the pixel value determination unit 12c determines that the pixel of interest corresponds to the code element pixel, and, if the brightness of the pixel of interest exceeds the second threshold, the pixel value determination unit 12c determines that the pixel of interest corresponds to the space pixel. Such step S140 corresponds to a determination step of determining whether the pixel value of the pixel included in the code image corresponds to the intermediate color.

In step S150, the pixel value converting unit 12d determines whether the pixel of interest corresponds to a "separated pixel", which is a pixel separated from the code elements by k pixels or more. The pixel of interest which is a target of the determination of step S150 is, of course, the intermediate color pixel. If the pixel of interest corresponds to the separated pixel, the pixel value converting unit 12d proceeds from the determination of "Yes" to step S150, if the pixel of interest does not correspond to the separated pixel, the pixel value converting unit 12d proceeds from the determination of "No" to step S170.

A pixel which is k pixels away from the code elements means the k-th pixel counted in a direction away from the code element pixel when a pixel adjacent to the code element pixel that is not the code element pixel is the first pixel. Note that, k is an integer of 2 or greater.

Here as an example, k=2. When k=2, the separated pixel may be defined as a pixel that is not adjacent to the code element. Additionally, when k=2, a pixel adjacent to the code element may be defined as an "adjacent pixel". The adjacent pixel is the pixel that is outside the code element and does not correspond to the separated pixel.

In step S160, the pixel value converting unit 12d converts the pixel value of pixel of interest into a color brighter than the intermediate color. A color brighter than the intermediate color is a color brighter than the second threshold, but here is the color of the space. Since the color of the space is basically white, thus in step S160, the pixel value converting unit 12d may convert the RGB value that is the pixel value of the pixel of interest into R=G=B=255. However, when the color of the space is not white, the pixel value converting unit 12d may convert the RGB value of the pixel of interest into a color of a space which is not that white. Step S160 corresponds to a pixel value converting step of converting the separated pixel, among the intermediate color pixels, into a pixel value brighter than the intermediate color. After step S160, the processing proceeds to step S170.

In step S170, the pixel value determination unit 12c determines whether all of the pixels included in the region corresponding to the code image detected in step S120 complete selection as the pixel of interest. Then, when an unselected pixel remains as the pixel of interest, the processing returns from the determination of "No" to step S130. On the other hand, when no unselected pixel remains as the pixel of interest, the processing proceeds from the determination of "Yes" to step S180.

In step S180, the color converting unit 12e executes the color conversion processing on the image data. When the image data includes the code image, the color conversion processing is, of course, executed on the image data that has undergone the processes in step S130 to step S170. The color conversion processing is a process to convert a color system of the image data into a color system of the ink which is used for recording in the recording unit 16, and is executed on each pixel. The color system of the image data is, for example, RGB as described above, and the color system of the ink is, for example, CMYK as described above. The color conversion processing is performed with reference to a color converting look-up table which is predetermined for the converting relationships of these color systems. As a result of the color conversion processing, the image data becomes CMYK data in a bitmap format including gradation values for each pixel.

Note that the timing for executing step S160 may be after step S180. In other words, the pixel value which is the target of the pixel value conversion in step S160 may be a CMYK value rather than an RGB value. In this case, the pixel value converting unit 12d may convert the CMYK value of a pixel included in the code image corresponding to the intermediate color pixel and the separated pixel into, for example, C=m=Y=K=0, with respect to the image data after the color conversion processing is proceeded.

In step S190, the HT processing unit 12f performs HT processing on the image data after the color conversion. The HT processing, briefly, is a process in which the gradation value for each pixel of the image data and each ink color CMYK are binarized into the information indicating ink discharge (dot on) or non-discharge (dot off). The HT processing is performed by, for example, a dither method or an error diffusion method.

In step S200, the control unit 11 outputs the image data after the HT processing to the recording unit 16 as recording data. In the output processing of step 200, the image data after the HT processing is output to the recording unit 16 after being appropriately rearranged according to the timing and order used by the recording unit 16. Such output processing is also referred to as a rasterization processing. As a result, the recording unit 16 executes a recording processing based on the recording data output from the image processing device 10.

Figure 3:
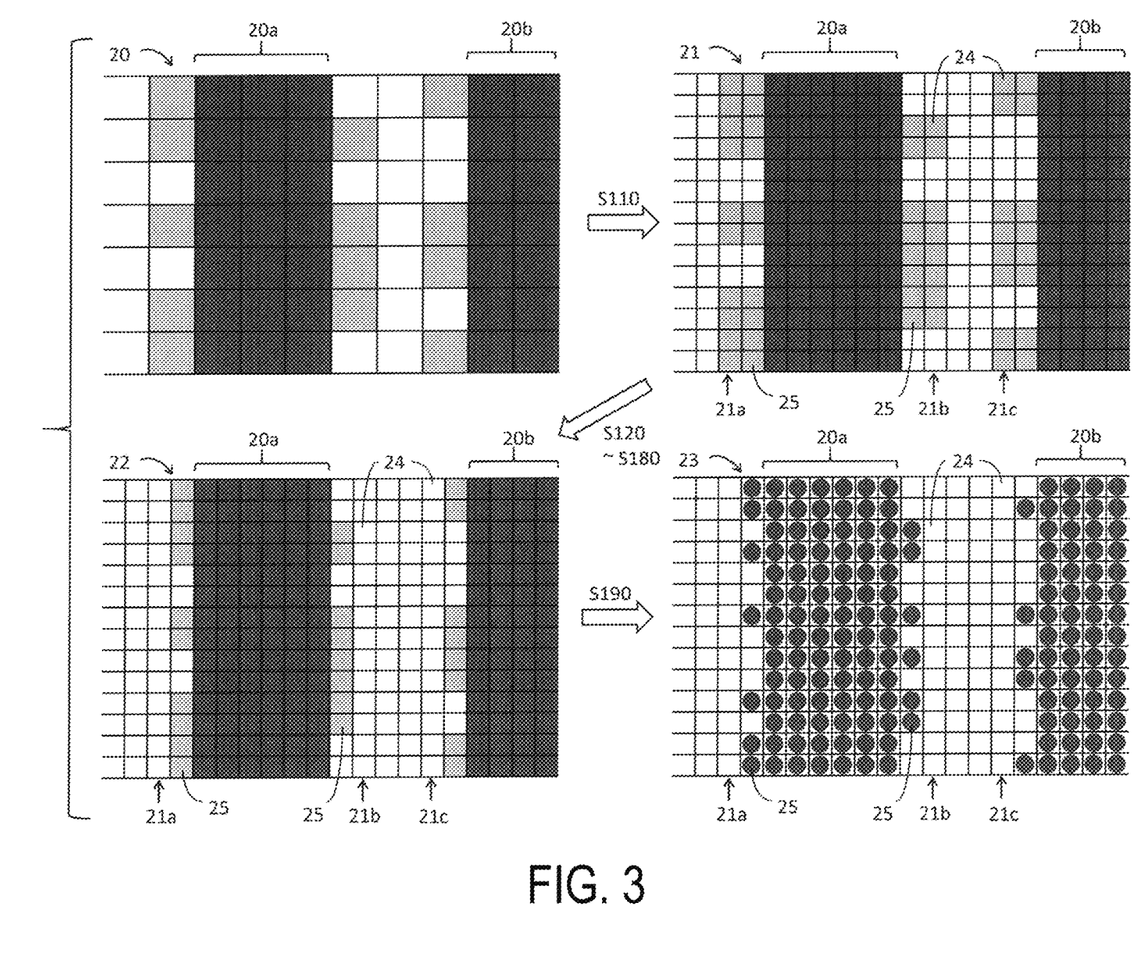
FIG. 3 is a diagram for explaining the flow of the image processing according to a specific example.

FIG. 3 is a diagram for explaining the flow of the pixel processing of the present embodiment using specific examples. In FIG. 3, sign 20 denotes a portion of a code image 20 that is a barcode in the image data. Each rectangle in the code image 20 and the like is each pixel. In FIG. 3, a black pixel is a code element pixel, each of the code elements 20a and 20b as each bar constituting the code image 20 is represented by a collection of the code element pixels. In FIG. 3, white pixels are space pixels, and a collection of space pixels represents the space between the bars. Also, in FIG. 3, the intermediate color pixel represented in gray correspond to the "blur" described above that occurs at the edge portion of the bar. In the image data acquired in step S100, such a blur sometimes occurs, sometimes does not occur in some part of the edge portion of the bar.

In step S110, the pixel number converting unit 12a executes pixel number converting on the image data including the code image 20. In the example illustrated in FIG. 3, the pixel numbers of the image data in both longitudinal direction and lateral direction are increased by 2 times by the pixel number conversion. In this case, the number of the code element pixel, the number of the space pixel, and the number of the intermediate color pixel are increased by 2 times in both longitudinal direction and lateral direction. The process of increasing the number of pixels is an interpolation of the pixels. In FIG. 3, the code image 20 after performing the pixel number converting in step S110 is a code image 21 using sign 21.

Processing of steps S120 to S180 is performed on the code image 21. In FIG. 3, the code image 21 after performing the processes in steps S120 to S180 is referred to as a code image 22 using the sign 22. In FIG. 3, the pixel columns 21a, 21b, and 21c are examples of pixel columns that are not adjacent to the code element 20a and the code element 20b. In other words, the pixel columns 21a, 21b, 21c are constituted by separated pixels. During the process of step S120 to S180, particularly by executing step S120 to S170, intermediate color pixels of the pixels included in such pixel columns 21a, 21b, 21c are target to pixel value conversion in step S160.

In FIG. 3, a pixel 24 corresponding to the separated pixel among the intermediate color pixels in the code image 21 is denoted by sign 24. Such pixels 24 are labeled as separated pixel 24. Additionally, in FIG. 3, a pixel 25 corresponding to the code element 20a among the intermediate color pixel in the code image 21 or an adjacent pixel adjacent to the code element 20b is denoted by sign 25. Such pixels 25 are labeled as adjacent pixel 25. As can be seen from FIG. 3, in the processing of converting the code image 21 into the code image 22, among the separated pixel 24 and the adjacent pixel 25, the pixel value of the separated pixel 24 are converted into the color of the space such as white by step S160.

The HT processing in step S190 is performed on the code image 22. In FIG. 3, the code image 22 after the HT processing unit 12f has executed the HT processing is referred to as code image 23 using the sign 23. The black circles illustrated in the pixels of the code image 23 are dots defined for each pixel by the HT processing. In accordance with HT process, dot on is basically defined for the code element pixels, and dot off is defined for the space pixels. Also, according to HT processing, for the intermediate color pixel, dot on or dot off is defined depending on the pixel value. Therefore, as illustrated in FIG. 3, dot on and dot off are defined for the adjacent pixel 25, but dot off is defined for the separated pixel 24.

Figure 4:
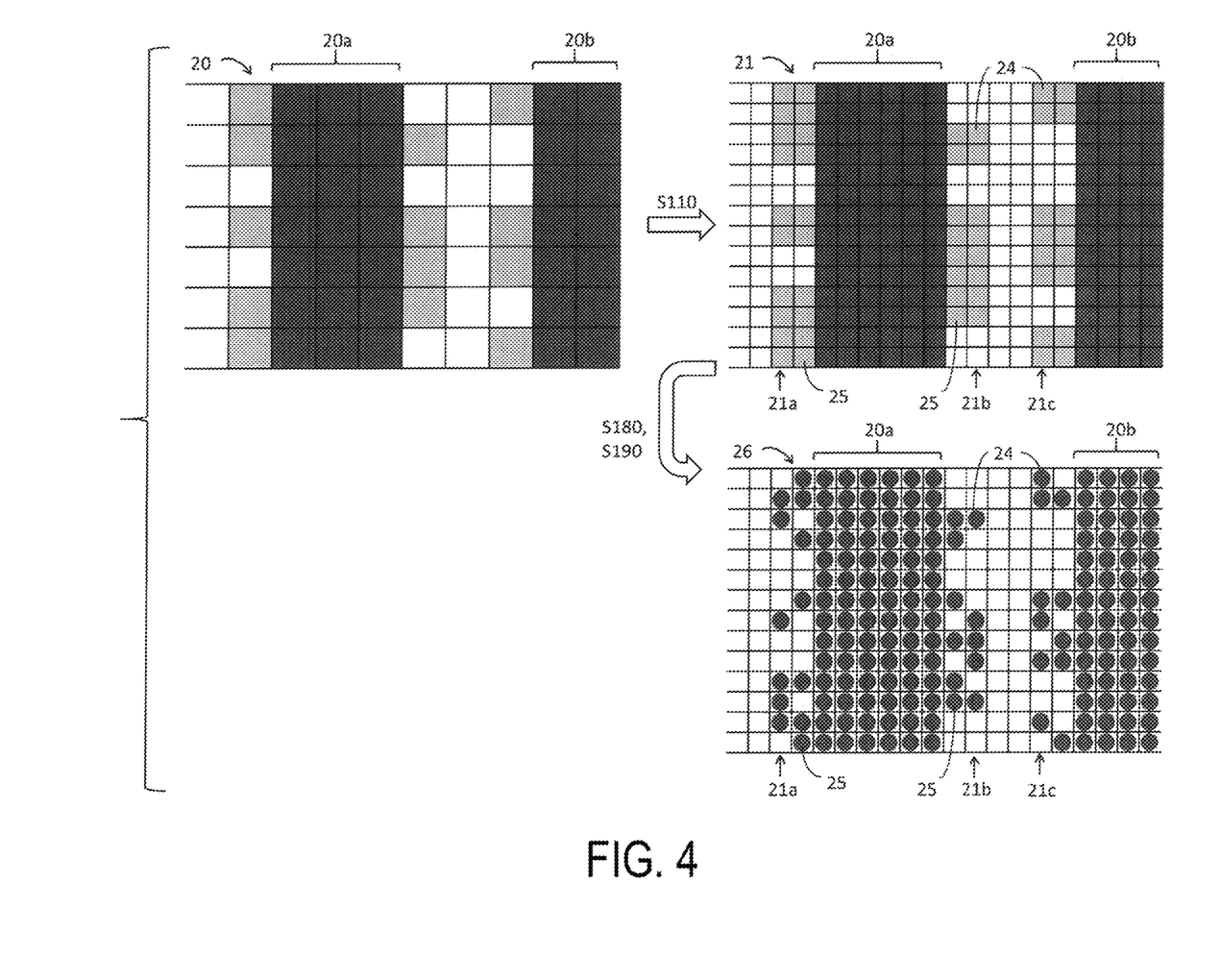
FIG. 4 is a diagram illustrating a comparative example of the present embodiment.

FIG. 4 is a diagram for explaining a comparative example to FIG. 3. The interpretation of FIG. 4 and the meaning of each sign in FIG. 4 are as explained in FIG. 3. However, in FIG. 4, the code image 21 targeted to pixel number converting in step S110 is only executed to the color conversion processing (S180) and the HT processing (step S190), and converted into the code image 26, and steps S120 to S170 related to the present embodiment are not executed. Therefore, in the comparative example of FIG. 4, as a result of the HT processing, even for the separated pixel 24, the possibility of dots occurrence is high. Since the dot is generated with respect to the separation pixel 24, the edge sloshing of the code elements 20a and 20b, and the thickening of code elements 20a and 20b, are being remarkable, the quality of the code image is degraded.

3. Conclusion

According to the present embodiment as described above, the image processing device 10 includes the code detection unit 12b configured to detect code image included in the input image, the pixel value determination unit 12c configured to determine whether the pixel value of each pixel included in the code image corresponds to the intermediate color between the color of the code elements constituting the code image and the color of the space between the code elements, and the pixel value converting unit 12d configured to convert the pixel value of the separated pixel that is a pixel separated from the code element by k pixels or more, among the intermediate color pixel that is determined to correspond to the intermediate color, into a pixel value brighter than the intermediate color. Wherein, k is an integer of 2 or greater.

According to the above-described configuration, the image processing device 10 converts the pixel value of the pixel corresponding the intermediate color pixel and the separated pixel, among the pixels included in the code image, into the pixel value brighter than the intermediate color. Accordingly, the occurrence of the dot at a position where the quality of the code image is reduced due to the blur included in the image data can be suppressed. In concrete terms, it can be seen by comparing FIG. 3 with FIG. 4, the dots generated corresponding to the separated pixels 24 in the code image 26 in FIG. 4, according to the present embodiment, do not occur as the separated pixels 24 in the code image 23 of FIG. 3. As a result, the edge sloshing of the code elements 20a and 20b and the thickening of the code elements 20a and 20b is reduced, the code image is recorded with a good quality.

According to the description of FIG. 3, it can be said that the present embodiment performs step S160 is particularly effective when the intermediate color pixel corresponding to the blur is increased in the code image due to the pixel number conversion of the input image. However, regardless of the execution or inexecution of the pixel number conversion on the input image, the present embodiment contributes to improving the quality of the code image by executing step S160 for the pixel corresponding to the separated pixel that is the intermediate color pixel corresponding to the blur in the code image.

In addition, according to the present embodiment, the image processing method including steps executed by the image processing device 10, and the image processing program 12 causing the computer to execute the image processing method can be understood as the present disclosure. Additionally, as described above, the recording device 1 including the functions of the image processing device 10 can be understood.

In addition, according to the present embodiment, the pixel value before conversion and the pixel value after conversion performed by the pixel value converting unit 12d are RGB values or CMYK values.

Additionally, according to the present embodiment, the "pixel value brighter than the intermediate color" refers to white or the color of the space. According to such a configuration, the occurrence of dots in positions separate from the code elements that make up the code image can be easily suppressed.

4. Modified Example

Next, several modified examples included in the present embodiment will be described. Various combinations of the embodiments and modification examples described heretofore are also included in the disclosure herein.

First Modified Example

The pixel value converting unit 12d may average pixel values of pixels that are intermediate color pixels and are adjacent pixels. Specifically, the pixel value converting unit 12d converts the pixel value of the pixels of interest, which are determined as "Yes" in step S140, and determined as "No" in step S150 into an average pixel value of pixels of interest that are determined as "Yes" in step S140 and are determined as "No" in step S150, at the timing before the HT processing of step S190. Though called as an intermediate color, it does not mean one color, the pixel values of the intermediate color pixels are varied. Therefore, the pixel value converting unit 12d averages the pixel values of pixels that are intermediate color pixels and adjacent pixels, thereby stabilizing the density in the vicinity of the edges of the code elements such as bars in the code image. As a result, the thickness of the code element after HT processing is stabilized, and the sloshing of the edge of the code element is further suppressed.

Second Modified Example

When a magnification of pixel number conversion performed by the pixel number converting unit 12a is an integer value, the pixel value converting unit 12*d* converts the pixel value of the adjacent pixel that is the intermediate color pixel, and the pixel value of the separated pixel that is an intermediate color pixel into the pixel value brighter than the intermediate color, when the magnification of the pixel number conversion performed by the pixel number converting unit 12*a* is a non-integer value, the pixel value converting unit 12*d* does not convert the pixel value of the adjacent pixel that is an intermediate color pixel into the pixel value brighter than the intermediate color, and converts the pixel value of the separated pixel that is an intermediate color pixel into the pixel value brighter than the intermediate color.

Figure 5:
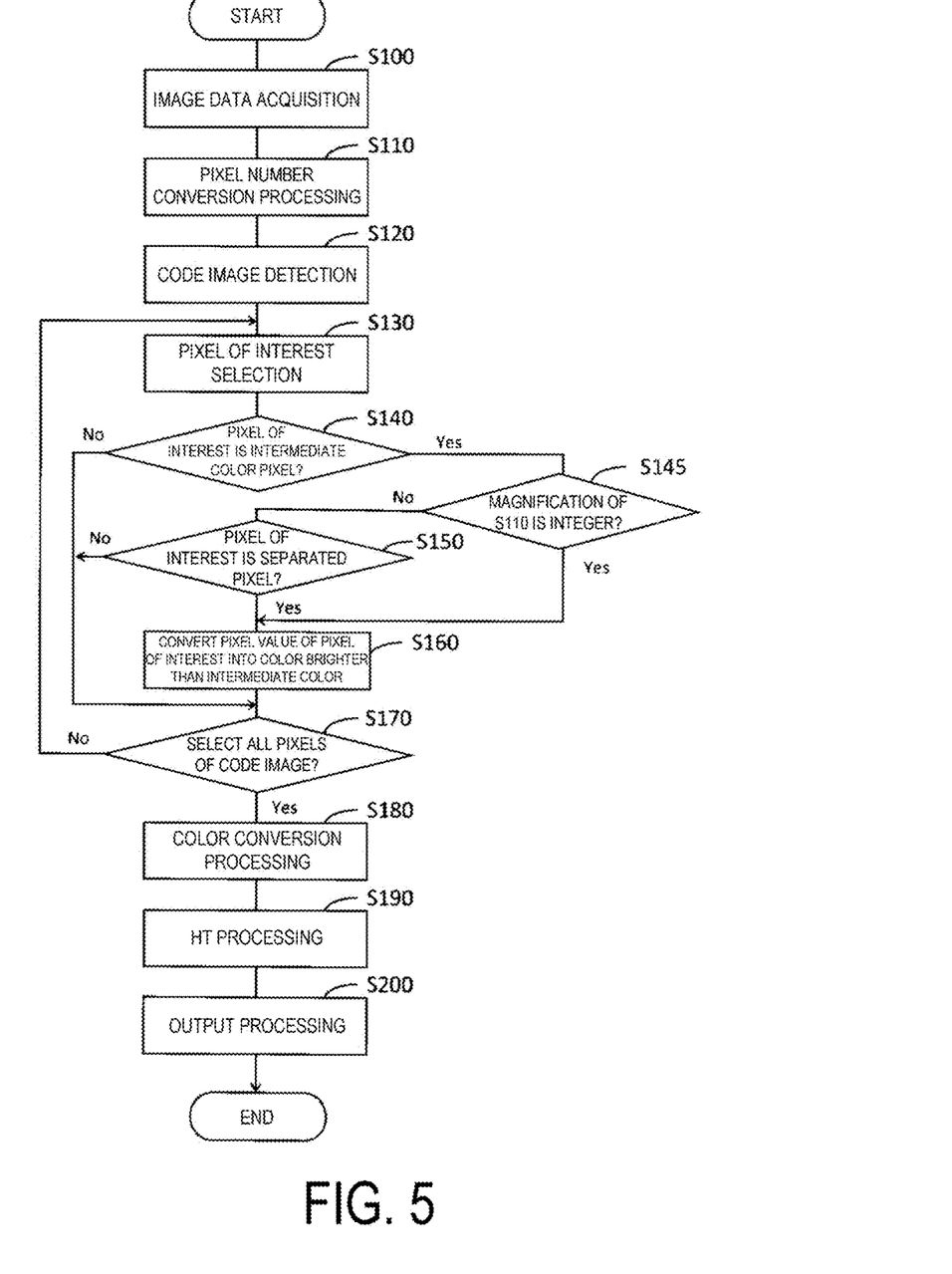
FIG. 5 is a flowchart illustrating image processing of a modified example.

FIG. 5 illustrates the image processing according to a second modified example in which the control unit 11 executes according to the image processing program 12 by a flowchart. The flowchart of FIG. 5 differs from the flowchart of FIG. 2 for the determination of step S145 is included. With respect to FIG. 5, the same content as FIG. 2 is omitted.

In step S145, the pixel value converting unit 12*d* branches processing according to whether the magnification of the pixel number converting executed by the pixel number converting unit 12*a* is an integer value in step S110. If the magnification of the pixel number converting is an integer value such as, for example, 1.0 times, 2.0 times, 3.0 times, the pixel value converting unit 12*d* proceeds from the determination of "Yes" to step S160. On the other hand, if the magnification of the pixel number converting is non-integer value such as, for example, 1.5 times, 2.5 times, the pixel value converting unit 12*d* proceeds from the determination of "No" to step S150. While repeating the cycles of steps S130 to S170 until "Yes" at step S170, the determination results of step S145 do not change.

In other words, in the second modified example, when the magnification of the pixel number converting in step S110 is an integer value, the pixel value converting unit 12*d* sets the pixel value as the target of the pixel value conversion in step S160, regardless of whether it is the separated pixel or an adjacent pixel, if it is an intermediate color pixel in the code image. If the magnification of the pixel number conversion is an integer value, in step S110, the number of the code element pixels, the number of the intermediate color pixels, and the number of the space pixels in the code image simply increase or do not change. Thus, when the magnification of the pixel number converting is an integer value, even if all of the intermediate color pixels in the code image are converted into a color equivalent to the space pixels, the thickness of the code element is not unnecessarily scraped, and the code element is suppressed from sloshing, the pixel value converting unit 12*d* proceeds to step 160 from the determination of step S145.

On the other hand, when the magnification of the pixel number conversion is a non-integer value, an interpolation method is employed in which, for example, a plurality of peripheral pixels, such as a bilinear method, is referred to and the interpolation pixels are generated for the pixel number converting in step S110. According to such an interpolation method, a new intermediate color pixel brighter than the color of the code element is easily generated between the code element pixel before interpolation and the intermediate color pixel. Then, the intermediate color pixel newly generated in this way can be said to be part of the interpolation result of the code element pixel before the interpolation, thus, if the pixel is converted into a color equivalent to the space pixel, there is a possibility that the thickness of the code element may be reduced more than necessary. Thus, when the magnification of the pixel number conversion is a non-integral multiple, the pixel value converting unit 12*d* proceeds from the determination in step S145 to step 150, and does not set the adjacent pixels in the intermediate color pixels performed in step S160 as the target of the pixel value conversion.

Other Description

Instead of executing step S160, the control unit 11 may execute processing corresponding to step S160 on the image data after the HT processing. That is, the control unit 11 may convert dot on to dot off on the pixels included in the image data after the HT processing to be a target of the pixel value converting in a case where it is assumed that the pixel value converting in step S160 is performed.

As described above, k≥2. For example, it may be set as k=3. When k=3, the separated pixel may be defined as a pixel located at a position where not less than 2 other pixels are interposed between the code elements. Therefore, when k=3, the adjacent pixel is not only a pixel adjacent to the code element, but also a pixel at a position where a pixel is interposed between the code elements.

What is claimed is:

1. An image processing device comprising:
    a processor configured to execute a plurality of functions as
        a code detection unit configured to detect a code image included in an input image;
        a pixel value determination unit configured to determine whether a pixel value of each pixel included in the code image corresponds to an intermediate color between a color of code elements constituting the code image and a color of a space between the code elements; and
        a pixel value converting unit configured to determine whether an intermediate color pixel that has been determined as corresponding to the intermediate color is a separated pixel which is a pixel spaced apart and separated from the code elements by k pixels or more, k being an integer of 2 or greater, the pixel value converting unit being further configured to convert a pixel value of the separated pixel into a pixel value brighter than the intermediate color, upon determining that the intermediate color pixel is the separated pixel.

2. The image processing device according to claim 1, wherein
    the pixel value brighter than the intermediate color is white or the color of the space.

3. The image processing device according to claim 1, wherein
    the pixel value converting unit averages pixel values of adjacent pixels that are the intermediate color pixels and do not correspond to the separated pixel.

4. The image processing device according to claim 1, wherein
    the pixel value before conversion and the pixel value after conversion performed by the pixel value converting unit are RGB values including respective gradations of red, green, and blue, or CMYK values including respective gradations of cyan, magenta, yellow, and black.

5. An image processing device comprising:
    a processor configured to execute a plurality of functions as
        a code detection unit configured to detect a code image included in an input image;

a pixel value determination unit configured to determine whether a pixel value of each pixel included in the code image corresponds to an intermediate color between a color of code elements constituting the code image and a color of a space between the code elements;

a pixel value converting unit configured to convert a pixel value of a separated pixel that is a pixel separated from the code elements by k pixels or more, among intermediate color pixels that are pixels determined to correspond to the intermediate color, into a pixel value brighter than the intermediate color; and a pixel number converting unit configured to convert the pixel number of the input image, wherein k is an integer of 2 or greater, when a magnification of pixel number conversion performed by the pixel number converting unit is an integer value, the pixel value converting unit converts a pixel value of an adjacent pixel that is the intermediate color pixel and does not correspond to the separated pixel, and the pixel value of the separated pixel that is the intermediate color pixel, into a pixel value brighter than the intermediate color, and when the magnification of pixel number conversion performed by the pixel number converting unit is a non-integer value, the pixel value converting unit does not convert the pixel value of the adjacent pixel that is the intermediate color pixel into a pixel value brighter than the intermediate color, and converts the pixel value of the separated pixel that is the intermediate color pixel into a pixel value brighter than the intermediate color.

6. An image processing method, comprising:

detecting a code image included in an input image;

determining whether a pixel value of each pixel included in the code image corresponds to an intermediate color between a color of code elements constituting the code image and a color of a space between the code elements;

determining whether an intermediate color pixel that has been determined as corresponding to the intermediate color is a separated pixel which is a pixel spaced apart and separated from the code elements by k pixels or more, k being an integer of 2 or greater; and converting a pixel value of the separated pixel into a pixel value brighter than the intermediate color upon determining that the intermediate color pixel is the separated pixel.

7. The image processing device according to claim 1, wherein upon determining that the intermediate color pixel is not the separated pixel, the pixel value converting unit is configured not to convert a pixel value of the intermediate color pixel, which is determined not to be the separated pixel, into the pixel value brighter than the intermediate color.

* * * * *